United States Patent [19]
Ide et al.

[11] Patent Number: 4,839,753
[45] Date of Patent: Jun. 13, 1989

[54] INFORMATION RECORDING DISK

[75] Inventors: Jun Ide; Tomoo Iizumi; Yoshitaka Takahashi; Hiroshi Yoshida, all of Furukawa; Tooru Kaneko; Yuichi Hishi, both of Miyagi, all of Japan

[73] Assignee: Alps Electric Co., Ltd., Japan

[21] Appl. No.: 108,773

[22] Filed: Oct. 15, 1987

[30] Foreign Application Priority Data

Dec. 8, 1986 [JP] Japan .................................. 61-290528

[51] Int. Cl.$^4$ ........................... G11B 5/09; G11B 15/04
[52] U.S. Cl. .......................................... 360/48; 360/60
[58] Field of Search .................................. 360/47–49, 360/60, 77, 78

[56] References Cited

U.S. PATENT DOCUMENTS

4,622,602 11/1986 Kutaragi ............................... 360/48
4,651,237  3/1987 Williams ............................... 360/48

Primary Examiner—Vincent P. Canney
Attorney, Agent, or Firm—Guy W. Shoup; Paul J. Winters; Stephen L. Malaska

[57] ABSTRACT

An information recording disk includes detection regions used to confirm presence or absence of written signals, read/write regions available for signal writing and write-project regions which reject signal writing. Regions where the detection regions and read/write regions overlap each other are originally provided with discriminating signals to distinguish these regions from at least the other regions. The write protect regions are distinguished from the read/write regions, referring to information detected by a head assembly.

10 Claims, 7 Drawing Sheets

INFORMATION RECORDING DISK

FIELD OF THE INVENTION

This invention relates to an information recording disk made from a disk-shaped base plate and information recording layers provided on surfaces of the base plate and used to write or read information thereon.

BACKGROUND OF THE INVENTION

There are known various forms of disk driving devices configured to record and/or reproduce information by rotating a magnetic recording medium in the form of a disk (hereinafter called a magnetic disk), for example. Among others, a disk driving device also called "hard disk device" is particularly used in a small-scaled, large-capacity system. Such a hard disk device is configured to rotate high revolution magnetic disks each made of a disk-shaped hard material having magnetic recording layers on surfaces thereof, and magnetic heads are opposed to the surfaces of the magnetic disks to record or reproduce signals thereon.

Figure 8:
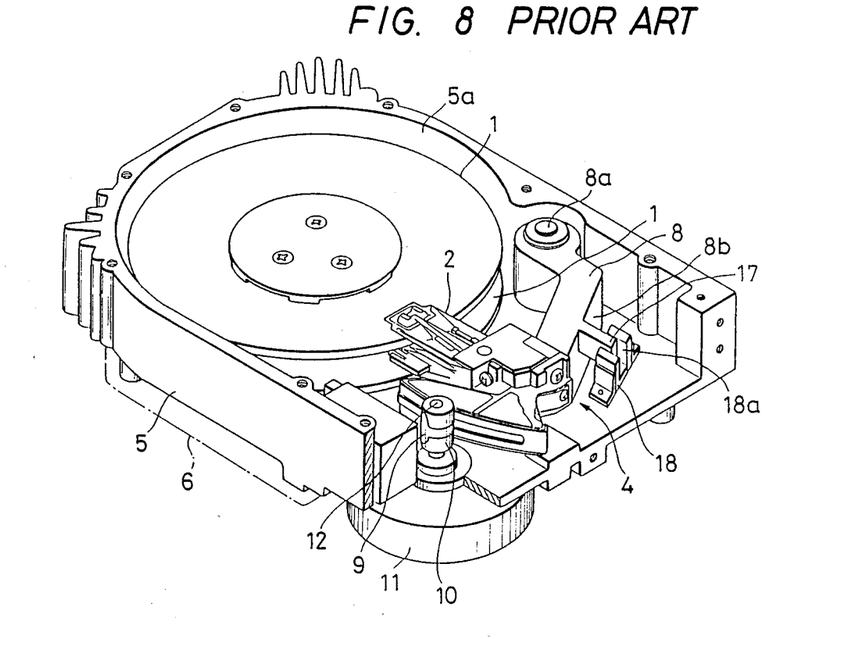
FIG. 8 is a fragmentary perspective view of a prior art disk driving device which is partly cut out to expose its interior structure.

FIG. 8 shows one form of disk driving device of this type. The disk driving device generally comprises magnetic disks 1 on which information is recorded, magnetic heads 2 which record or reproduce information on or from the magnetic disks 1, a direct drive motor (not shown. Hereinafter called "DD motor") which drives the magnetic disks 1, a head driving mechanism 4 which moves the magnetic heads 2 to predetermined tracks on the magnetic disks 1, and a support board 5 which supports a housing which sealingly accepts therein the magnetic disks 1, the magnetic heads 2 and other members. The disk driving device further comprises a printed board 6 on which a motor driving circuit, control circuit, etc. are printed, and a frame (not shown) which holds the printed board 6 on the support board 5.

The illustrated magnetic disk device includes two magnetic disks 1. Each magnetic disk 1 has two recording surfaces on opposite planar surfaces thereof. Therefore, the illustrated disk mechanism includes four magnetic heads 1 associated with respective surfaces of the magnetic disks 1. The magnetic heads 2 are mounted on a swing arm 8 of the head driving mechanism 4 by canti-lever springs. The head driving mechanism 4 consists of the swing arm 8, a steel belt 9 mounted on a part of the swing arm 8, a pulley 10 on which an intermediate portion of the steel belt engages, and a stepping motor 11 which has a drive shaft 12 supporting the pulley 10 combined with the steel belt 9, so that when the stepping motor 11 is driven, the swing arm 8 swings about a pivot pin 8a thereof.

The magnetic disks 1, magnetic heads 2, swing arm 8, steel belt 9 and pulley 10 are accepted in the casing which consists of the support board 5 and a top cover (not shown). To establish an airtight sealing of the housing, gaskets are used at the contact between the support board 5 and the top cover and at the mounting portion of the stepping motor 11. Further, magnetic fluid is applied around the shaft of the DD motor for the same purpose. The swing arm 8 is provided with a shutter 17 extending outwardly away from the magnetic heads 2. Nearer to an airtight chamber of the support board 5 is provided a photo interrupter 18 serving as an outside sensor. The photo interrupter 18 defines an insertion path 18a which receives the shutter 17 loosely. In the prior art arrangement, when a magnetic head 2 reaches a zero track position at an outer circumference on an associated recording surface, the shutter 17 blocks the light path provided in the insertion path 18a of the photo interrupter 18.

In the arrangement using the stepping motor 11 to transport the magnetic heads 2, head positioning is difficult when the track density of the disks is increased. More specifically, since different materials in the hard disk apparatus have different expansion coefficients, there occurs a problem called "thermal off-track" in which the position of a magnetic head 2 relative to tracks on a recording surface varies with temperature. Therefore, in a 5.25 inch-type hard disk apparatus, it is difficult to precisely position the magnetic head 2 beyond 400TPI unless a servo system is used.

U.S. Pat. No. 122,503 discloses a control system using a servo system in which the inner-most and outer-most tracks are used as particular servo tracks. This system is called "ID-OD system" in abbreviation of "inner diameter" and "outer diameter". In this system, the disk apparatus is configured to first read the outer servo track and effect fine adjustment to place the head at the center of the track. Subsequently, the head is moved toward the inner servo track. In this operation, step pulses of the stepping motor in the head driving mechanism are counted, so that when the head reaches the inner servo track, the head positioning mechanism effects precise positioning to bring the head to the center of the track. While the accurate positioning is effected for each servo track, the positioning mechanism is informed of a correction amount necessary for finding the center of the track. Obtaining the correction amount, the positioning mechanism is enabled to calibrate precise positions of respective tracks according to information about the number of step pulses required for movement between the outer and inner tracks and about the fine step correction amount required in each servo track.

Further, the magnetic disk apparatus records information by saturation recording.

Saturation recording 2 is such that the current flowing to each head for its information writing is larger than a current value which saturates the magnetization of the magnetized layer of the magnetic disk in one direction. The saturation recording feature is in that new information can be written by "over-writing" which does not require erasure of old information. This simplifies the head construction and enables an instant changeover between reading and writing operations. Therefore, a single track may be divided into multiple sectors so that reading and writing may be effected per each sector, and this contributes to the maximum use of the recording surfaces without loss.

Figure 9:
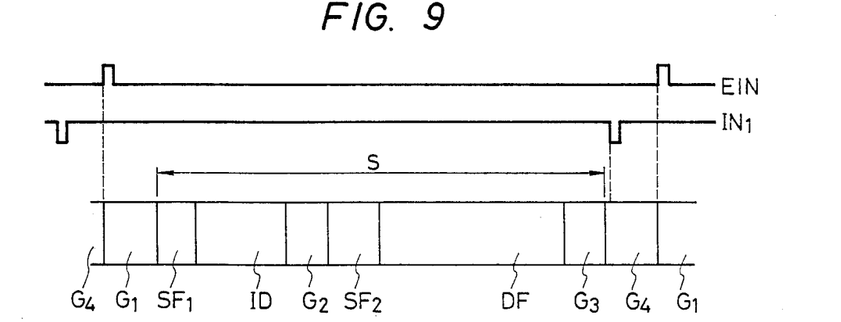
FIG. 9 is an explanatory view showing a format.

In order to write or read information on a magnetic disk, it is necessary to make a format in an information recording region on the magnetic disk. The format may be formed as shown in FIG. 9, for example, in which one cycle from first to fourth gap is divided into 32 sectors related to the exterior index signal EIN.

The first gap G1 is used to absorb a deviation of the exterior index signal EIN, and provided with "4E" written thereon at 16 byte unit. A sync field (VFO Sync Field) SF1 subsequent to the first gap G1 is used to lock the VFO (PLO) of the controller prior to an address search. Data digits are all zero, i.e. the data consists of clocks alone. In an ID field ID subsequent to the sync field are written check codes of an address mark, cylinder, head, sector and its region. A second gap G2 subsequent to the ID field ID is called "write space gap" and used for signal writing on a data field DF. The head is changed from its reading mode to writing mode therein with respect to the data field DF. Therefore, the second gap G2 provides the switching time. A sync field SF2 subsequent to the second gap G2 has the substantially same function as the first sync field SF1 preceding the ID field ID. However, the contents of the sync field SF2 are renewed concurrently with renewal of the subsequent data field DF which is used to write data thereon. A third gap G3 is provided subsequent to the data field DF. The third gap G3 is called "inner-record gap" and has a predetermined length because any change in the rotation of the DD motor 3 may destroy a subsequent sector S during a writing operation in a preceding sector S. The region from the leading sync field SF1 of the ID field ID to the third gap G3 forms one of 32 sectors, for example. A final, fourth gap G4 is provided subsequent to the third gap G3 at the 32nd sector from the first gap G1, and is provided with a predetermined signal to provide a length of the fourth gap G4 until detection of an exterior index signal EIN. The fourth gap G4 changes with velocity of the DD motor 3 and is called "speed tolerance gap".

The fourth gap G4 is 352 bytes in the most traditional aforegoing format of 256 bytes ×32 sectors, and occupies about 4.1% of all the bytes. Practically, since the length of the byte changes with velocity of the DD motor 3, only a limited region near the first gap G1 is used for servo control seeking.

The rotating angle of a pulse generating magnet 40 attached to the rotor of the DD motor 3 is detected by a Hall element or other magnetic detection means, and used as the first interior index signal IN1. The exterior index signal EIN corresponding to the first gap G1 is supplied when a predetermined number is counted after detection of the first interior index signal IN1. That is, the exterior index signal EIN is applied to the host computer 26 when the aforegoing count number is detected after detection of the interior index signal IN1, and the position represents the beginning of the recording tracks T.

Such a format is usually formed in the recording regions except those having servo information thereon before shipment of the system, and a formatting is effected by an end user when he first uses the magnetic disk driving device having the magnetic disk therein to enable information writing in the data field of the format.

In an ID-OD or other system in which servo information is provided in limited tracks alone, positional control of the head is effected based on the servo information which is written in a relationship with exciting phases of a stepping motor or other device for transporting the magnetic head. Therefore, if the stepping motor mis-steps for any reason, it sometimes occurs that the formatting is written, erasing the servo information. If the formatting is once written on the servo information, the system cannot obtain the servo information thereafter, and cannot position the head accurately.

Further, disk driving devices known heretofore are configured to detect the zero track of a magnetic disk, using a sensor or other mechanical means, or alternatively using a particular signal specifically written in the radial direction for zero track detection to unable rewriting in the region having the particular signal.

However, the use of such a mechanical means invites an increase of the manufacturing cost of the system because of an additional cost not only for the sensor or other means itself but also for a more difficult assembling process caused by more complicated zero track positional adjustment. The use of the particular signal to unable rewriting thereon necessarily requires a slowdown of the disk rotation to adjust the transporting speed, and this causes an instablity of the head assembly and an increase of the error rate.

OBJECT OF THE INVENTION

It is therefore an object of the invention to provide an information recording disk from which servo information is never erased during formatting.

A further object of the invention is to provide an information recording disk enabling zero track detection without using a sensor or particular signal for zero track detection.

SUMMARY OF THE INVENTION

According to one aspect of the invention, an information recording disk is made from a disk-shaped base plate and information recording layers coated on surfaces of the base plate so that a head assembly writes or reads information on the information recording disk. On surfaces of the information recording disk are provided detection regions used to confirm presence or absence of signals thereon, read/write regions available for signal writing thereon, and write-protect regions rejecting signal writing thereon. In regions where the detection regions and read/write regions overlap with each other are written specific signals which distinguish the regions at least from the other regions.

With this arrangement, since the specific signals are written on the overlapping regions, the write-protect regions can be discriminated from the read/write regions by detecting information on the detection regions by the head without using a particular detection means. This simplifies the write-rejecting arrangement in the write-protect regions, and enables zero track detection using the write-protect regions.

BRIEF DESCRIPTION OF THE DRAWINGS

FIGS. 1 through 6 are views for explanation of an embodiment of the invention in which:

DETAILED DESCRIPTION

Figure 1:
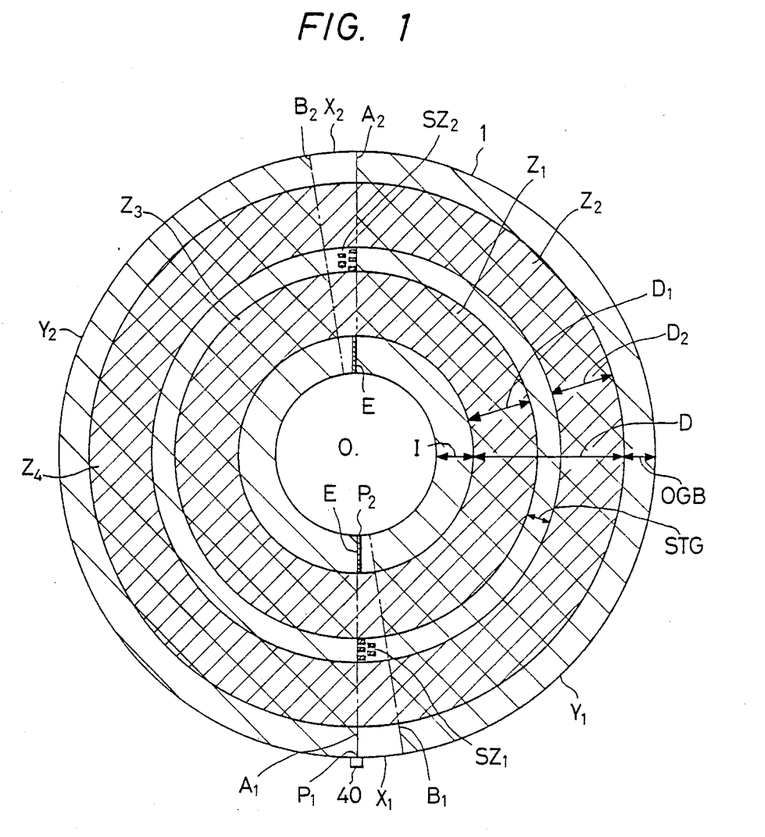
FIG. 1 is an explanatory view of a magnetic disk according to the embodiment.
Figure 2:
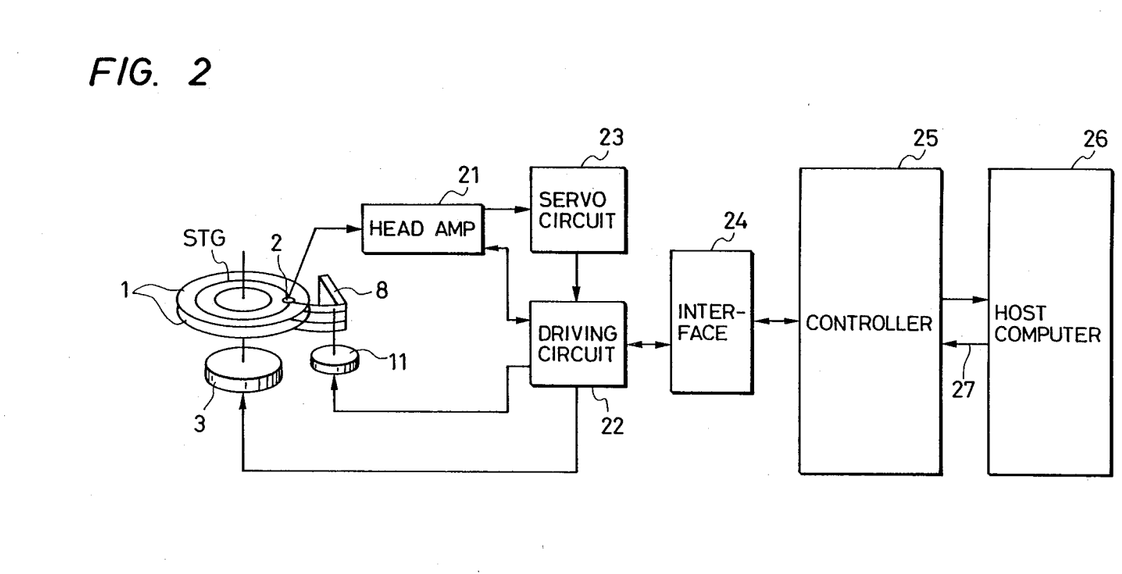
FIG. 2 is a block diagram showing a control system in a disk driving device related to the embodiment.
Figure 3:
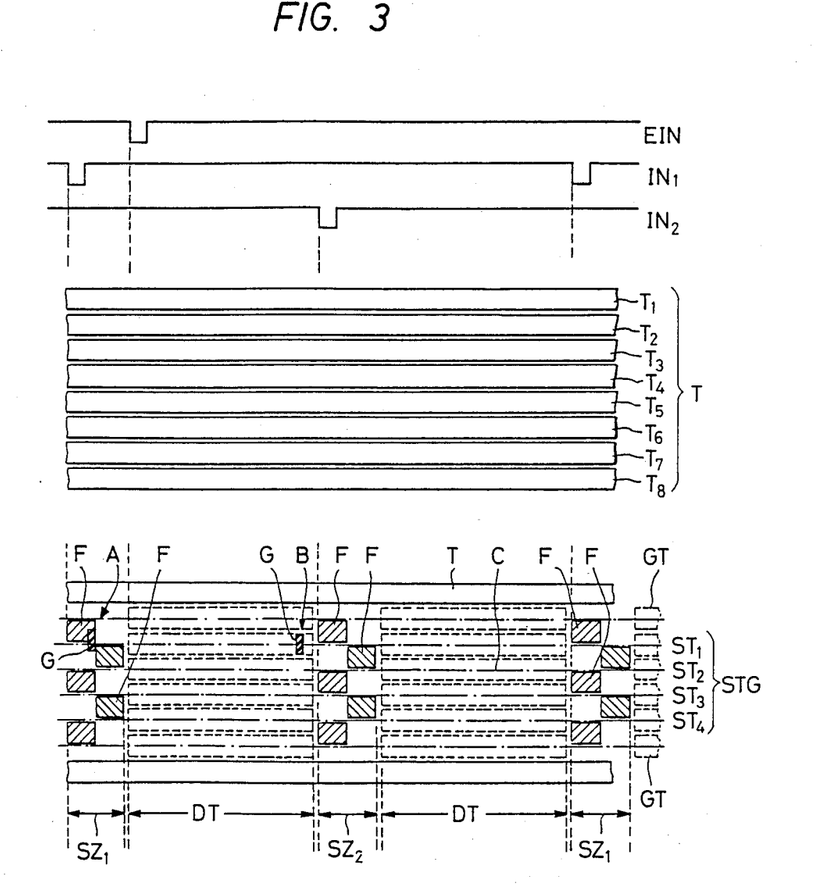
FIG. 3 is an explanatory view showing recording tracks and a configuration of written servo information of the magnetic disk.
Figure 4:
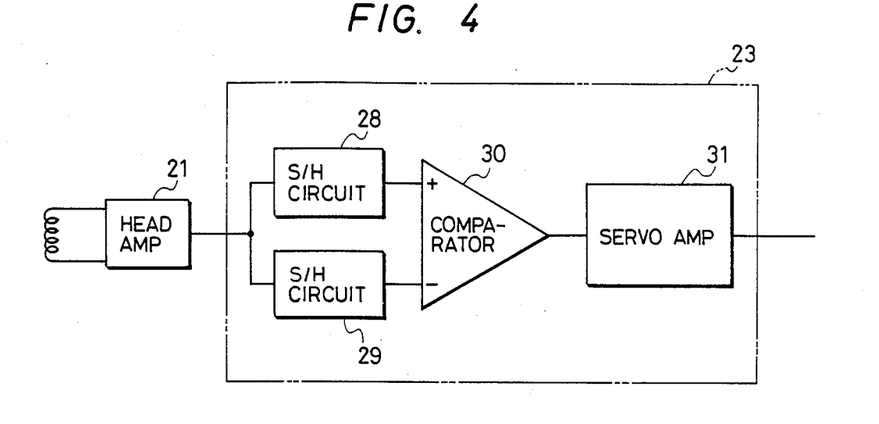
FIG. 4 is a block diagram of a servo circuit.
Figure 5:
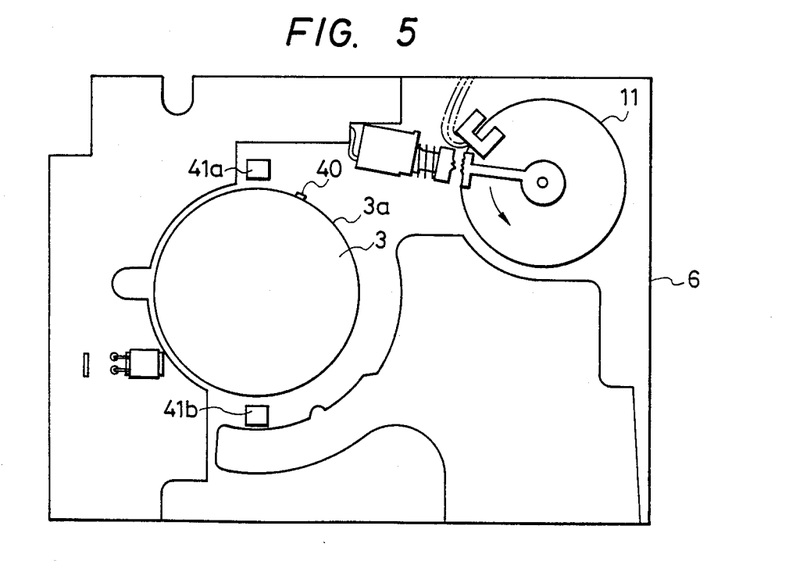
FIG. 5 is a bottom view of the disk driving device for explanation of index detection.
Figure 6:
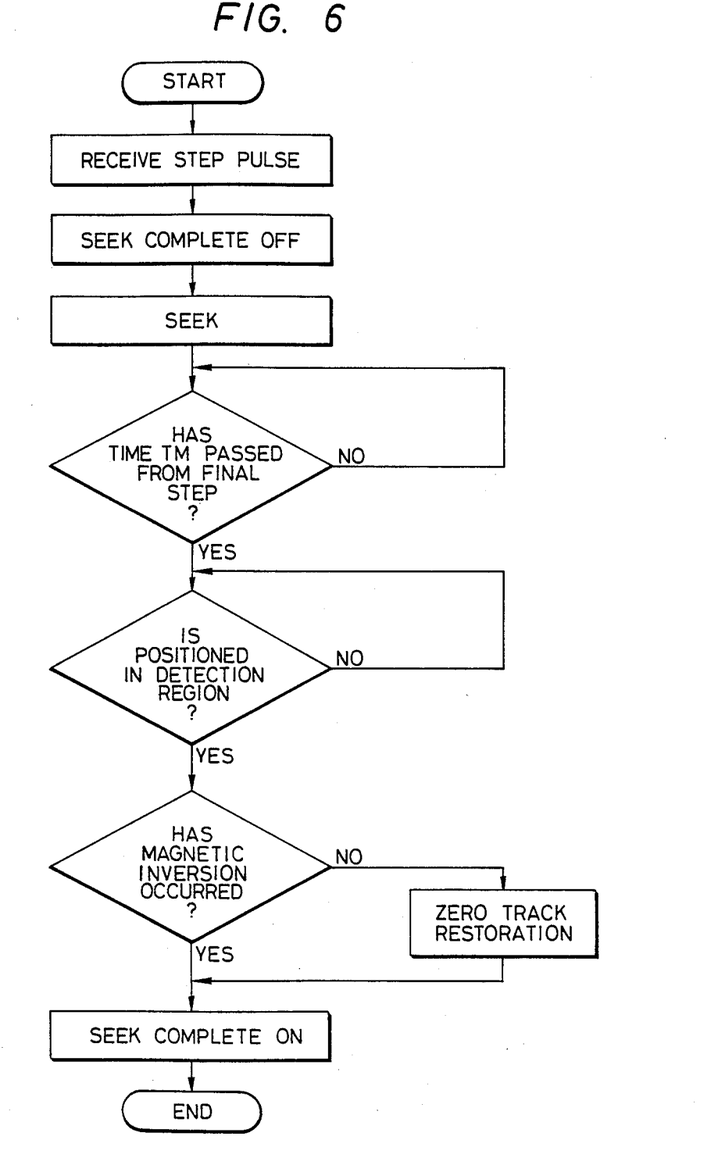
FIG. 6 is a flow chart of a seek control of the disk driving device.
Figure 7:
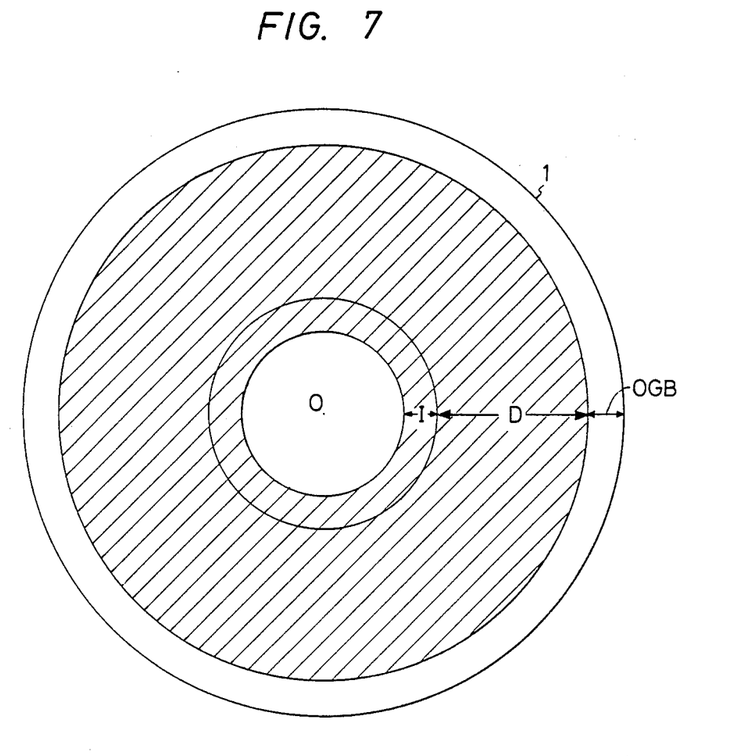
FIG. 7 is an explanatory view of a modified arrangement of the magnetic disk.

The invention is described below in detail, referring to preferred embodiments illustrated in the drawings. FIGS. 1 through 6 are views for explanation of an embodiment of the invention, in which FIG. 1 is an explanatory view of a magnetic disk according to the embodiment; FIG. 2 is a block diagram showing a control system of a disk driving device related to the embodiment; FIG. 3 is an explanatory view showing recording tracks on the magnetic disk and a configuration of written servo signals; FIG. 4 is a block diagram of a servo circuit; FIG. 5 is a bottom view of the disk driving device for explanation of its index detection; and FIG. 6 is a flow chart showing a seek control of the disk driving device. FIG. 7 is an explanatory view of a modified magnetic disk. The disk driving device itself is identical to the prior art system of FIG. 8, and some members which are or may be regarded to be substantially equal to those of the prior art system are designated by the same reference numerals.

In FIG. 2, the control system of the disk driving device controls a DD motor 3 for rotating a magnetic disk 1 and controls a stepping motor 11 for swinging a swing arm 8. The control system comprises a driving circuit 22 for signal transmission and reception with respect to a head amplifier 21, a servo circuit 23 which processes servo information detected by the magnetic head 2 and amplified by the head amplifier 21 to supply the driving circuit 22 with an electric signal concerning servo control, and a controller 25 which controls the driving circuit 22 via an interface 24. The controller 25 is connected to a host computer 26 by a bass 27 to enable signal processing of a signal detected by the magnetic head 2 or a signal to be transmitted to the magnetic head 2.

FIG. 1 shows a configuration of servo tracks and recording tracks not provided with servo information both formed on the magnetic disk 1. The magnetic disk 1 may be made from an aluminum plate having a magnetic coating. The magnetic disk 1 has an inhibit zone I and a data zone D. The inhibit zone I is located at a radially innermost position of the magnetic disk 1, and no data is written on it. The data zone D is located at a radially outer position of the inhibit zone I and has about six hundred recording tracks T aligned concentrically. The data zone D is divided into two regions D1 and D2. In a boundary region between the zones D1 and D2, a group of servo tracks STG in which four tracks as shown in FIG. 3 form one group. In the servo track group STG, servo zones SZ1 and SZ2 are provided on which servo signals F are written as servo information at 180 degree intervals.

FIG. 3 shows the servo track group STG. The servo track group STG includes four servo tracks ST1, ST2, ST3 and ST4 on which servo signals F are written alternatingly at a uniform frequency and in a zigzag configuration at positions equally distant from a center line D in the length (circumferential) direction, in a relationship with first and second interior index signals IN1 and IN2. They serve as the aforegoing servo zones SZ1 and SZ2. In this case, since the servo signals F are written by a single magnetic head 2, the widths of the servo signals F, recording tracks T and servo tracks ST1 through ST4 coincide with the length of a gap G of the magnetic head 2. An off-track phenomenum occurs when the position of the gap G of the magnetic head 2 deviates from a desired recording track T.

In this embodiment, a 180 degree phase difference is provided between the servo zones SZ1 and SZ2, considering the time required for positional correction of the magnetic head 2 and the time required for one revolution of the magnetic disk 1. More specifically, the time required for one revolution of the magnetic disk 1 is about 16.65 msec at 3600 rpm, and the time from energization to deeneragization of the stepping motor 11 is about 8 msec. Therefore, with the 180- degree phase difference in the servo zones, it is possible to correct the position of the magnetic head by detecting the servo signal F in the servo zone SZ1 associated with the first interior signal IN1, for example, and just after the termination of the correcting operation, it is possible to confirm whether the correcting operation is adequate or not, by detecting the servo signal F in the servo zone SZ2 associated with the second interior index signal IN2. In this case, since the time for one revolution of the magnetic disk 1 has the aforegoing relationship with the energized duration of the stepping motor 11, two servo zones are provided in one cycle at 180 degree intervals. However, according to an employed type of stepping motor or other driving motor and an employed type of recording medium, they may be modified, considering the time taken for the positioning motion of the stepping motor and the revolution of the recording medium. Whatever motor or recording medium is employed, the system will sufficiently function with one to several servo zones per cycle.

Further, in the disk driving device, since the servo zones SZ1 and SZ2 are formed at 180 degree intervals, the same phase difference is also required in the first and second interior index signals IN1 and IN2. In this connection, as shown in FIG. 5, for example, a magnet 40 (hereinafter called "PG magnet") serving as a pulse generating means is provided at an outer circumferential portion of a rotor 3a of the DD motor 3, so that a magnetic change in the PG magnet 40 is detected by coils, Hall elements, or other detecting means 41a and 41b (hereinafter called "PG sensor"), for example, provided near the outer circumferential portion of a rotor 3a of the DD motor 3 and symmetrically opposed to each other about the rotation axis of the DD motor 3, in order to use detection pulses as the first and second interior index signals IN1 and IN2.

Four servo tracks form one group for the reason explained below.

In the stepping motor 11, rotating angles in individual steps are not completely uniform due to the presence of errors in distances between magnetic pole teeth or between magnetized portions of the rotor. Therefore, when a stepping motor of four-phase unipolar type or two-phase bipolar type is used, one cycle is established by eight steps totaling four steps in one-phase excitation and four steps in two-phase excitation. It is recognized that errors in the rotation angles by the exciting phases in individual half revolutions exhibit a uniform pattern. Therefore, by configuring the system to correct rotating angles of four tracks in a half cycle, maintaining a close relationship between the rotating angle and an exciting voltage, the same control factor also applies to every other four recording tracks.

FIG. 3 also shows guard tracks GT provided radially inward and outward of the servo track group STG. Individual guard tracks GT and servo tracks ST1 through ST4 include dummy tracks DT having no servo signal F recorded thereon and never used as a data region. In FIG. 3, reference symbol EIN denotes an exterior index signal. When the first index signal IN1 is detected as described above, counting is commenced, and when a predetermined counting number is detected, the exterior index signal EIN is transmitted to the host computer 26. The exterior index signal EIN is used as an index for writing or reading on the recording tracks T in the data zone D.

Radially outside the data zone D, i.e. in a position radially outside the zero track located at the outer-most circumference of the data zone D is provided an outer guard band OGB on which no data is written, i.e. no inverse-magnetized region is formed. Therefore, the magnetic disk 1 is divided into five annular regions of inner guard band I, first data region D1, servo track group STG, second data region D2 and outer guard band OGB in this sequence from the center thereof. All these regions are concentrical about the center 0 of the magnetic disk 1. Among them, the servo track group STG and the outer guard band OGB are write-protect regions whereas the first and second data zones D1 and D2 are read-write regions on which information is recorded. Although the inner guard band I does not require write-protection and is not used to read or write signals, it may be write-protected by writing a discriminating signal E having a relationship with the interior index signals IN1 and IN2 to ensure more clear distinction from the other regions. The region up to the innermost circumference of the inner guard band I is a use settling region of the magnetic disk 1.

On the other hand, by rotating a line P1P2 about the center of the magnetic disk 1 by every predetermined angle which line P1P2 connect a first point P1 at the outer-most circumference and a second point P2 at the inner-most circumference along an imaginary radial line A1 in the use settling region, the magnetic disk is divided into multiple regions. These regions are a sectorial region X1 defined by the radial imaginary line A1 (corresponding to the interior index IN1) and an imaginary line B1, a sectorial region Y1 defined by the imaginary line B1 and an imaginary line A2 (corresponding to the interior index IN2), a sectorial region X2 defined by the imaginary line A2 and an imaginary line B2, and a region Y2 defined by the imaginary line B2 and the imaginary line A1. The imaginary lines B1 and B2 are located at radial positions corresponding to predetermined times from reception of the interior index signals IN1 and IN2, so as to use the regions Y1 and Y2 as detection regions and use the regions X1 and X2 as non-detection regions.

Data is written throughout the entire circumference of the data zones D1 and D2 whereas the other regions are DC-erased to reject data writing thereon. In this configuration, regions Z1, Z2, Z3 and Z4 where the detection regions Y1, Y2 and the data zones D1, D2 overlap each other are defined. Although data is written throughout the data zones D1 and D2 in the illustration, data may be originally written on the regions Z1 through Z4 alone. In this case, some signal is written in the data zones D1 and D2 in the non-detection regions X1 and X2 after formatting to establish the same configuration as the illustrated arrangement in which signals are written throughout the data zones D1 and D2. Further, the detection regions Y1 and Y2 are two sectorial regions in the illustration. However, when the servo signal F is written in a single portion alone, the detection regions Y1 and Y2 may be partly cut out into semi-annular configurations. If an open loop control not using the servo signal F is employed, they may be configured as a complete annular region by writing signals in the inhibit zone I as well, as shown in FIG. 7.

The disk driving device using the above-described magnetic disk operates as follows.

This type of disk driving system exhibits relatively large temperature variations between its dormant and activated conditions. The magnetic disk 1 is thermally expanded with time after power supply to the disk driving device, and the thermal expansion causes a thermal off-track. The amount of expansion gradually increases soon after the power supply, and reaches a substantially constant value in approximately 35 minutes.

In this connection, just after power is entered in the disk driving device, the magnetic head 2 first scans the surface of the magnetic disk 1 to memorize in a RAM of the driving circuit 22 the electrical amount concerning exciting phases of the stepping motor 11 corresponding to respective records tracks T, and thereby makes the RAM table. Additionally, a positioning correction system considers an increase of the temperature originally stored in a microcomputer so that recording or reproduction is performed in accordance with the servo algorithm stored in the microcomputer. More specifically, if the microcomputer gives the driving circuit 22 a servo instruction based on the aforegoing servo algorithm while recording or reproduction of a desired recording track is performed by energization of a predetermined exciting phase indicated by the RAM table, the magnetic head 2 is moved from a recording track T1 (or T5) for example, to a servo track ST1 of FIG. 3, for example, in the same exciting phase as the recording track T1 (T5) and in a servo zone ST. If the magnetic head 2 is heretofore located at the recording track T2 (T6), it is moved to the servo track ST2. Similarly, if the recording track is T3 (T7) or T4 (T8), the servo track will be ST3 or ST4, respectively. In this embodiment, one cycle of the stepping motor 11 consists of eight steps. Therefore, one servo zone has four tracks corresponding to the number of steps per half cycle of the stepping motor 11. When other form of the stepping motor 11 or other control system is employed, the number of servo tracks will be changed accordingly.

Assuming that the same exciting phase is energized by the same current value, and the gap G of the magnetic head 2 located at position A in FIG. 3 detects a servo signal F, a difference arises between the level of a precedingly detected servo signal and the level of a subsequently detected servo signal. In this connection, sample holding circuits 28 and 29 of the servo circuit 23 discriminate the signals, and a comparator 30 compares their signal levels. A servo amplifier 31 determines a current value for supply to the exciting phases of the steppig motor 11 in accordance with the comparison result to control the stepping motor 11 via the driving circuit 22. In this fashion, the gap G of the magnetic head 2 is moved to position B (FIG. 3) which is symmetrical about the center line O, and the fine track position is fixed with respect to the servo track ST1.

Just after the movement of the magnetic head 2 is terminated, a servo signal F in the second servo zone SZ2 is detected for the aforegoing reason to judge in the second servo zone SZ2 whether the movement is adequate or not. More specifically, if an output from the comparator circuit 30 in the second servo zone SZ2 is lower than a predetermined level, the present movement condition is maintained. However, if the output is higher than the predetermined level, the stepping motor 11 is driven again to effect the same positional control to bring the magnetic head 2 to a precise track position, i.e. the fine track position.

A current value supplied to an exciting phase of the stepping motor 11 on arrival to the fine track position is stored in the RAM of the driving circuit 22, and the magnetic head 2 returns to its original track T1, referring to the aforegoing RAM table, so that the position of the gap G with respect to the recording track T1 is fixed by the current value stored in the RAM. In this fashion, the fine track position is established also in the recording track T1. In the disk driving device configured to effect such a servo correction, the DD motor 3 begins its rotation when power is entered, and the magnetic disk 1 rotates responsively. With this rotation, the magnetic head 2 floats at the inner-most inhibit zone I, one goes to the outer-most zero track to confirm the track position, and subsequently moves to the inputted recording track T.

At this time, there is a possibility that the stepping motor erroneously steps to the servo track ST which should be write-protected, and that the servo signal F is erased when a write signal is entered, so that servo correction is unabled thereafter. To avoid this, a control method as shown in the flow chart of FIG. 6 is employed.

More specifically, when the driving circuit 22 receives a step pulse from the host computer 26, the seek completion is turned off, and the stepping motor 1 is driven to activate the magnetic head 2 for its seeking operation. After the seeking operation is effected, it takes a certain time, i.e. a settling time for the magnetic head 2 to take a stable position in the target recording track T either in a buffer mode seeking or in a normal mode seeking. In this connection, it must be confirmed whether the time TM required at least for the settling motion has passed or not after the final step. Additionally, after it is confirmed that the settling has been completed or not, it is further confirmed that the magnetic head 2 is located in the detection region Y1 or Y2. This is performed by controlling the time taken from the interior indexes IN1 and IN2 to the imaginary lines B1 and B2. More specifically, when the aforegoing time has passed after the interior indexes IN1 and IN2 are produced, it is recognized that the magnetic head 2 is located in the detection region Y1 or Y2, and it is confirmed whether magnetic inversion has occurred or not. If magnetic inversion is detected, this means that the magnetic head 2 is located in the read/write region D1 or D2. Therefore, considering that no mis-step occurred, the seek complete is turned on, and writing or reading is performed, In contrast, if magnetic inversion is not detected, this means that the magnetic head 2 is located at least in a write-protect region, i.e. in one of the servo tracks ST, inner guard band I and outer guard band OGB. This shows presence of a mis-step. In this configuration, the position of the magnetic head 2 is not known in the driving circuit 22. Therefore, zero track restoration is effected, and the head 2 is moved to seek to a track corresponding to the step pulse inputted from the zero track position to turn on the seek complete to perform desired writing or reading.

With this control method, the servo signal F is never erased from the servo tracks ST while an end user performes a formating.

Therefore, if data is originally written on the data regions D1 and D2, either signal including a formatting signal necessarily remains on the data regions D1 and D2 after formatting, so that the aforegoing servo control is reliably effected after the formatting as well.

In the aforegoing embodiment, the servo signal F alone is written in the servo tracks ST, and no data is written in the outer guard band OGB. Therefore, the zero track can be detected by detecting the recording track position adjacent the inner-most circumference of the write-protect region having no signal thereon. In detection of the servo tracks ST, the regions having the servo signal F written thereon can be defined by excluding the write-protect regions having no signal throughout their entire circumferences.

In the above-described embodiment, the inner guard band I is used as a write protect region, with the discriminating signal E written thereon in a relationship with the interior indexes IN1 and IN2. However, if data is originally written on all regions except the outer guard band OGB as shown in FIG. 7 referred to above, zero track detection can be readily effected, referring to presence or absence of the data.

Further, in the described embodiment, the detection regions Y1 and Y2 are defined by rotating the line P1P2 (connecting the first point P1 at an outer position and the second point P2 at an inner position along the radial imaginary line A1) a predetermined angle about the center 0 of the magnetic disk 1. However, they may be configured as multiple annular regions of one track width unit by selecting the points P1 and P2 at an outer circumerential margin and an inner circumferential margin of a track corresponding to an exciting phase, e.g. phase "A" of the stepping motor 11, making a radially intermittently extending line P1P2 connecting the points P1 and P2, and rotating it about the center 0. However, this arrangement also requires to exclude regions corresponding to the aforegoing regions X1 and X2 from detection regions as being non-detection regions. In this fashion, the detection regions can be related to exciting phases of the stepping motor 11.

In the aforegoing description, data written on at least the overlapping regions Z1, Z2, Z3 and Z4 are merely required to distinguish the regions from the other regions. Therefore, any modification concerning data writing concentration or frequency is a mere design choice.

As described above, the invention information recording disk includes detection regions used to confirm presence or absence of written signal on the disk surfaces, read/write regions available for signal writing and write-protect regions rejecting signal writing, and overlapping regions where the detection regions and read/write regions overlap each other are originally provided with a discriminating signal for clear distinction thereof from at least the other regions. Therefore, the write-protect regions can be clearly distinguished from the read/write regions, referring to information detected by the head assembly. This eliminates erroneous erasure of servo signals during formatting. Additionally, since the boundaries between the read/write regions and the write-protect regions are defined clearly, the zero track position at the outer-most circumference of the read/write regions can be readily detected without using a mechanical means.

What is claimed is:

1. In an information recording disk made from a disk-shaped base plate and information recording layers formed on surfaces of the base plate and available for repeated writing thereon so that a head assembly writes or reads signals on the information recording disk, an improvement comprising: detection regions formed on surfaces of said information recording disk and used to confirm presence or absence of written signals; read/write regions formed on surfaces of said information recording disk and available for signal writing thereon;

and write-protect regions formed on surfaces of said information recording disk and rejecting signal writing thereon, said detection regions and said read/write regions overlapping each other, and said overlapping regions being originally provided with a discriminating signal to distinguish them from at least the other regions.

2. An information recording disk of claim 1 wherein said detection regions are defined by taking a line connecting first and second points aligned in the radial direction of said information recording disk and rotating said line about the center of said information recording disk.

3. An information recording disk of claim 2 wherein said detection regions extend throughout the entire length in the circumferential direction.

4. An information recording disk of claim 2 wherein said detection regions extend over limited lengths in the circumferential direction.

5. An information recording disk of claim 2 wherein said first point is located at the radially outer-most circumference of said information recording disk whereas said second point is located at the radially inner-most circumference of said information recording disk.

6. An information recording disk of claim 2 wherein said first and second points are located at opposite margins of a track width corresponding to a predetermined rotating position of a head transporting motor.

7. An information recording disk of claim 6 wherein said head transporting motor is a stepping motor, and said rotating position is a predetermined exciting phase of said stepping motor.

8. An information recording disk of claim 1 wherein said-write protect region is an outer guard band located radially outside a zero track.

9. An information recording disk of claim 1 wherein said write-protect region is a servo track on which information concerning track center position calibration is written.

10. An information recording disk of claim 1 wherein said information recording layers are magnetic recording layers.

* * * * *

UNITED STATES PATENT AND TRADEMARK OFFICE
CERTIFICATE OF CORRECTION

PATENT NO. : 4,839,753
DATED : June 13, 1989
INVENTOR(S) : Jun Ide; Tomoo Iizumi; Yoshitaka Takahashi; Hiroshi Yoshida; Tooru Kaneko; Yuichi Hishi It is certified that error appears in the above-identified patent and that said Letters Patent is hereby corrected as shown below:

On the title page, item [57],
Abstract

Line 4, "project" should read -- protect --.

Signed and Sealed this

Seventeenth Day of April, 1990

Attest:

HARRY F. MANBECK, JR.

*Attesting Officer*     *Commissioner of Patents and Trademarks*